United States Patent
Siebott et al.

(10) Patent No.: US 7,362,659 B2
(45) Date of Patent: Apr. 22, 2008

(54) LOW CURRENT MICROCONTROLLER CIRCUIT

(75) Inventors: Jonathan Siebott, Hatboro, PA (US); Richard Frantz, Hatboro, PA (US)

(73) Assignee: Action Manufacturing Company, Philadelphia, PA (US)

( * ) Notice: Subject to any disclaimer, the term of this patent is extended or adjusted under 35 U.S.C. 154(b) by 790 days.

(21) Appl. No.: 10/193,437

(22) Filed: Jul. 11, 2002

(65) Prior Publication Data

US 2004/0008587 A1  Jan. 15, 2004

(51) Int. Cl.
  *F02C 9/00*  (2006.01)

(52) U.S. Cl. .................. 368/10; 368/108; 102/215; 102/276

(58) Field of Classification Search ........... 368/121, 368/10, 11, 203–204, 108, 118, 119; 102/215, 102/265, 270, 276, 427; 361/247–249, 253, 361/264; 320/133, 155; 331/12, 46, 158, 331/160, 162
  See application file for complete search history.

(56) References Cited

U.S. PATENT DOCUMENTS

| | | | | |
|---|---|---|---|---|
| 3,500,746 A | * | 3/1970 | Ambrosini | 102/215 |
| 4,178,578 A | * | 12/1979 | Hall | 367/139 |
| 4,920,884 A | * | 5/1990 | Haglund et al. | 102/215 |
| 5,343,795 A | * | 9/1994 | Ziemba et al. | 89/6.5 |
| 5,440,990 A | * | 8/1995 | Wiedefeld et al. | 102/215 |
| 5,845,204 A | * | 12/1998 | Chapman et al. | 455/343.1 |
| 6,252,826 B1 | * | 6/2001 | Kaizu et al. | 368/120 |
| 6,272,995 B1 |  | 8/2001 | Schmidt et al. | 102/209 |
| 6,317,007 B1 | * | 11/2001 | Parris et al. | 331/57 |
| 6,666,123 B1 | * | 12/2003 | Adams et al. | 89/6.5 |
| 7,157,187 B2 | * | 1/2007 | Jenson | 429/231.95 |
| 2003/0199260 A1 | * | 10/2003 | Casey et al. | 455/150.1 |

* cited by examiner

*Primary Examiner*—P. Austin Bradley
*Assistant Examiner*—Jeanne-Marguerite Goodwin
(74) *Attorney, Agent, or Firm*—Fish & Richardson P.C.

(57) ABSTRACT

A method and system for accurate timing in a low current system useful in fuzing applications generates a first count of oscillations of an oscillator of unknown frequency during a first period of unknown duration. A second count of oscillations of the oscillator is generated during a second period of a known duration. The duration of the first period is calculated based on the first count and the second count. A solid-state, thin-film battery is able to be used by virtue of low-current characteristics of the system, enabling extended shelf life for fuzing systems.

15 Claims, 9 Drawing Sheets

LOW CURRENT MICROCONTROLLER CIRCUIT

TECHNICAL FIELD

The present invention relates generally to microcontroller circuits and, in particular, to ultra low current microcontroller circuits.

BACKGROUND OF THE INVENTION

Fuzing systems generally use a power source coupled with a timing system to trigger a firing circuit. It is often a requirement for such fuzing systems to have an extended shelf life. It is also often a requirement for such fuzing systems to be operable over a wide temperature range.

Solid-state lithium (SSLi) batteries have a long shelf life of twenty years or more. This longevity is partly due to chemical stability and partly due to a self-discharge rate of less than 2% of capacity per year per $cm^2$. N. J. Dudney et al., *Rechargeable Thin-Film Batteries with $LiMn_2O_4$ and $LiCoO_2$ Cathodes*, $197^{th}$ meeting of the Electrochemical Society, 4 (Spring 2000). Unfortunately, use of SSLi batteries in conventional fuzing systems has been generally rejected because SSLi batteries have poor low or cold temperature performance. For example, an SSLi battery having a current capacity of $100\mu$ amperes at a temperature of $+20°$ C. may have a current capacity of only $20\mu$ amperes at a temperature of $-50°$ C. The limited ability of an SSLi battery to deliver current at cold temperatures is due to a dramatic nonlinear increase of its internal resistance as a function of lowered temperatures.

It would thus be desirable to overcome the shortcomings of conventional fuzing systems.

SUMMARY OF THE INVENTION

To achieve these and other objects, and in view of its purposes, the present invention provides a method and system for accurate timing in a low current system. A first count corresponding to oscillations of a first oscillator during a first period of unknown duration is generated. A second count corresponding to oscillations of the first oscillator during a second period of known duration is generated. The duration of the first period is calculated based on the first count and the second count.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

First Exemplary Embodiment

Figure 1:
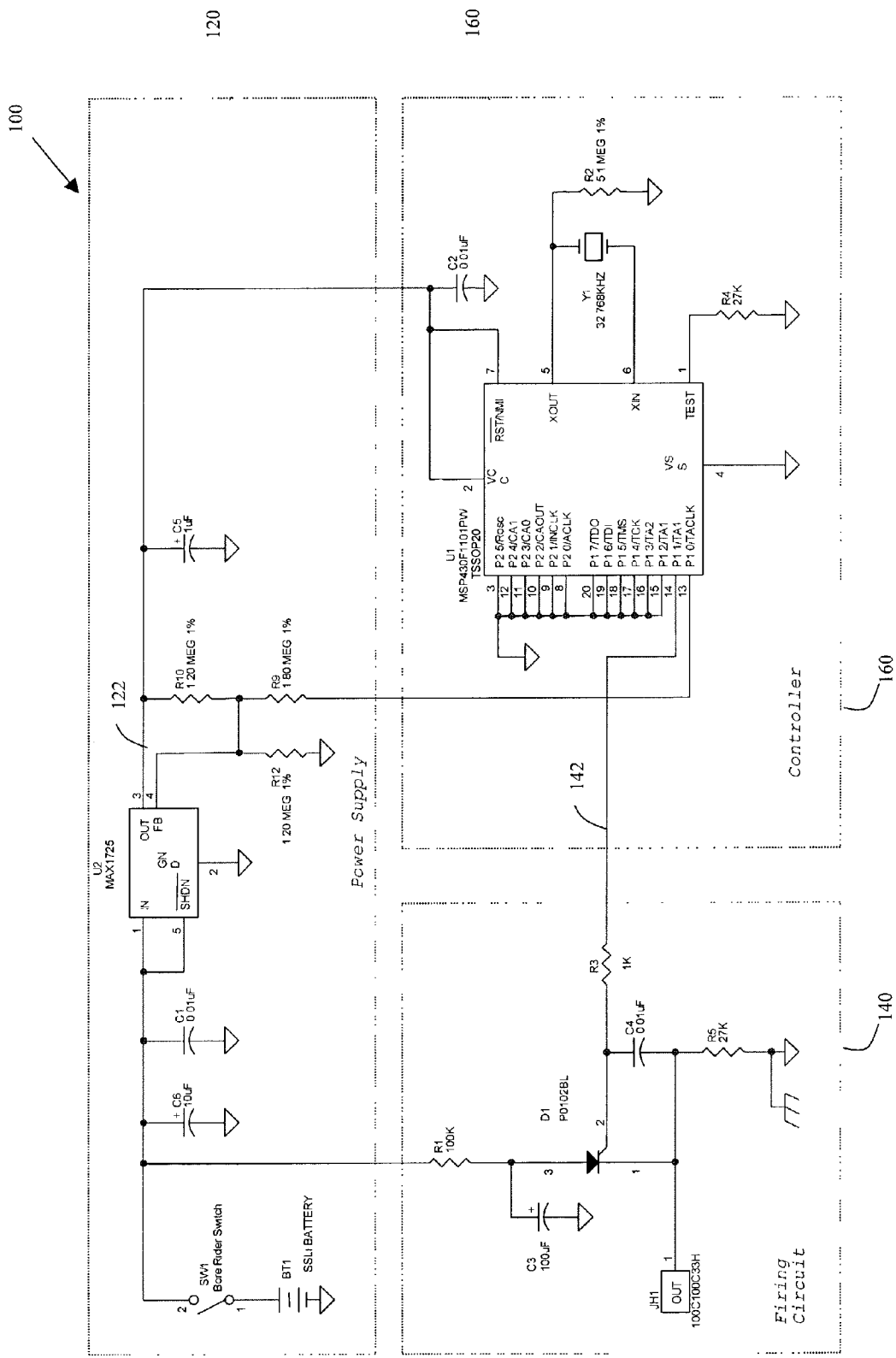
FIG. 1 is a schematic of a circuit according to a first exemplary embodiment of the present invention.

Referring now to the drawing, in which like reference numerals refer to like elements throughout, FIG. 1 illustrates an exemplary low current microprocessor circuit 100 having a shelf life of twenty years in a self-destruct application for fuzing systems. The circuit 100 comprises three functional areas, a power supply 120, a firing circuit 140, and a controller 160.

The power supply 120 comprises the following components: a solid-state lithium (SSLi) battery BT1; a switch SW1; resistors R9, R10, and R12; capacitors C1, C5, and C6; and a low quiescent regulator U2.

The power supply 120 regulates input voltages from a power source (battery BT1 in this case) ranging from 2 volts to 12 volts to one of two output levels determined by the controller 160. In this exemplary embodiment, the two output voltages are 2 volts and 3 volts. The regulator U2 in this exemplary embodiment is a Maxim MAX1725 regulator which operates at a current of less than $3.0\mu$ amperes. The resistors R10 and R12 form a feedback network that determines the voltage level of the output voltage signal line 122. The feedback network is coupled to the controller 160 by a resistor R9 whereby the controller 160 can control the output voltage signal 122 by altering the feedback to the regulator U2. The capacitors C1, C5 and C6 provide stability and filtration.

In addition to generating the voltage on output voltage signal line 122, the power supply 120 charges capacitor C3 of the firing circuit 140 to the same voltage as the battery BT1. The firing circuit 140 is connected to the output of the battery BT1 before the regulator U2 so the firing circuit 140 can benefit from the full potential of the battery BT1.

The firing circuit 140 comprises the following components: resistors R1, R3 and R5; capacitors C3 and C4; and a silicon controlled rectifier (SCR) D1. The firing circuit 140 stores energy in the form of a charge on capacitor C3 and delivers a firing energy to the output JH1 in response to a firing signal from the controller 160 on output signal line 142. The resistor R1 couples the firing circuit 140 to the power supply 120 and limits the peak current drawn by the firing circuit 140 from the battery BT1, in this case to $50\mu$ amperes. In addition to limiting current drawn from the battery BT1, the resistance of resistor R1 is also chosen so the RC time constant of resistor R1 and capacitor C3 allows capacitor C3 to adequately charge prior to delivery of the firing energy to output JH1. In this exemplary embodiment, the RC time constant is chosen to be below 12 seconds to ensure that capacitor C3 is fully charged within about 45 seconds after switch SW1 is closed.

The firing signal generated by the controller 160 on output signal line 142 is coupled to the SCR D1 via a resistor R3. In response to the firing signal from the controller 160, the SCR D1 will act like a closed switch and current will flow from the charged capacitor C3 to the output JH1, thereby 'dumping' the firing energy into an output device (not shown). In this exemplary embodiment, the output device is a pyrotechnic device, and, more particularly, is an electrically initiated detonator under the part name M100.

The controller 160 comprises the following components: resistors R2 and R4; capacitor C2; quartz crystal Y1; and mixed signal microcontroller U1. The controller 160 functions, via firmware, to control the voltage level of the output voltage signal line 122 output by the regulator U2, to compensate for the startup delay of the crystal Y1 and keep time, and to generate the firing signal on output signal line 142.

In this exemplary embodiment, the microcontroller U1 is a Texas Instruments MSP430F1101PW Mixed Signal Microcontroller. The microcontroller U1 has three operating modes, one of which is a low power mode. In the low power mode, the microcontroller U1 is clocked by a low frequency, standard 32.768 kHz crystal Y1, and typically operates at a current below 2µ amperes.

A low frequency crystal oscillator is used due to its low power requirement. Low frequency crystal oscillators provide high accuracy timing; however they have a long startup delay that is exacerbated in low current environments. This may result in inaccurate timing from power-on-reset (POR). For example, if a crystal oscillator inconsistently takes between 200 m seconds and 600 m seconds to start, this may result in a significant and undesirable error in timing from POR.

The controller 160 corrects for the startup delay of the crystal oscillator by means of firmware discussed subsequently to achieve high accuracy timing from power-on-reset (POR) in a low current system. It should be noted that equipping controller 160 with firmware for achieving high accuracy timing is optional in many applications where such high accuracy timing is not critical, including self-destruct circuits. Thus, although controller 160 in this embodiment includes such firmware for startup delay correction, it is not a requirement to achieve the long-shelf life and other advantages associated with this embodiment.

Immediately following POR, a microprocessor begins counting via an internal RC oscillator that has a negligible startup delay. The RC oscillator has an unknown frequency due to variances in its oscillation frequency of up to 100% that result from wide temperature and process variations. When the crystal oscillator starts, the microprocessor stores the number of cycles of the RC oscillator since POR. This provides the crystal startup time in terms of the RC oscillator cycles at an unknown frequency.

In order to accurately determine the crystal startup time, the number of RC oscillator cycles occurring during the startup time is then converted to a number of crystal oscillator cycles which are at a known frequency. This is accomplished by timing the number of RC oscillator cycles during a predetermined number of crystal oscillator cycles. The accurate startup time may then be applied to calculate an accurate system time from POR.

Figure 2:
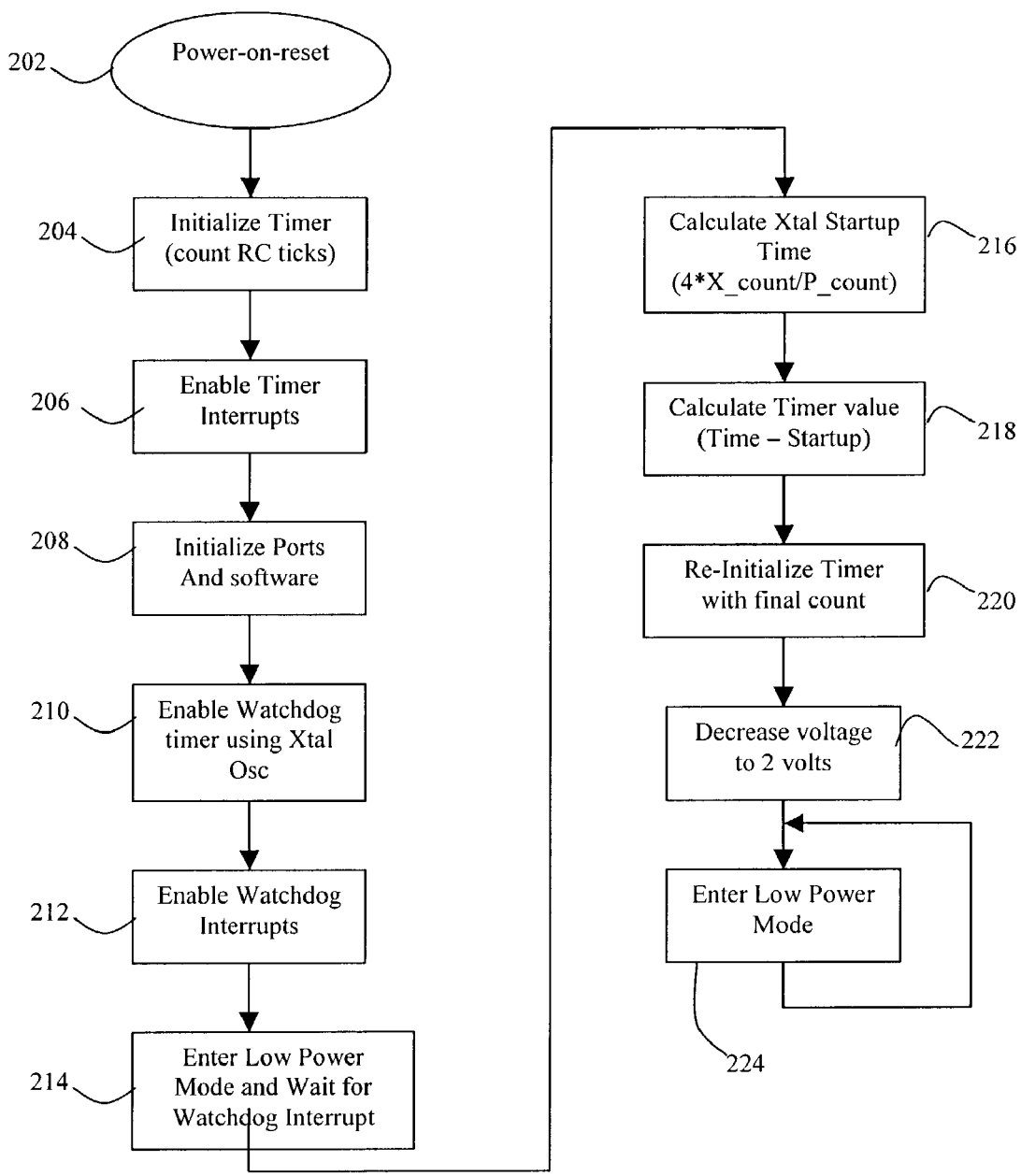
FIG. 2 is a flow chart of a main processor routine according to the first exemplary embodiment.
Figure 3:
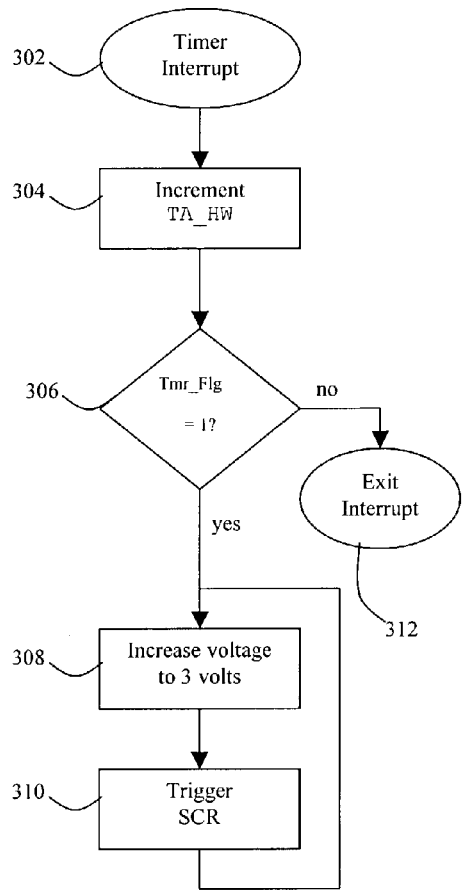
FIG. 3 is a flow chart of a timer interrupt service routine according to the first exemplary embodiment.

The operation of the microcontroller U1 is described below with reference to flow charts of a main processor routine shown in FIG. 2, a timer interrupt service routine shown in FIG. 3, and a watchdog interrupt service routine shown in FIG. 4.

The microcontroller U1 comprises an internal RC oscillator that functions as a clock source for the central processing unit (CPU) of the microcontroller upon power-on-reset. With reference to FIG. 2, upon power-on-reset (step 202), the microcontroller U1 configures (step 204) an internal timer (Timer A) to count the cycles of the internal RC oscillator. The Timer A interrupt is then enabled (step 206) to generate an interrupt upon any overflow of Timer A that may occur. Listed below is exemplary firmware in pseudo C code to implement the above functions.

```
// Initialize Xtal startup timing
    BCSCTL1 = 0x84;         // ACLK = 1/1 Xtal
    BCSCTL2 = 0x00;         // SMCLK = 1/1 DCOCLK
    CCR0 = 0xFFFF;          // Set CCR0 to max
    TACTL = 0x2D4;          // Timer = 1/1 SMCLK
    CCTL0 = CCIE;           // enable CCR0 interrupt
```

After setting up Timer A and enabling its interrupts, the CPU will continue initializing the remaining hardware and software registers (step 208). The CPU also initializes the Watchdog Timer (steps 210, 212) so that it will generate an interrupt after the crystal oscillator begins oscillating. Listed below is exemplary firmware in pseudo C code to implement the above functions.

```
//Now setup the ports
    P1OUT = 0;              // All outputs = 0
    P1DIR = 0xF3;           // same as above
    IE1 |= WDTIE;           // enable watchdog interrupts
    _EINT( );
    WDTCTL = 0x5A1F;        // Start WDT as 1.953 mSec
                            Timer
    Proc_Time = D_Proc_Time;  // Get default proc_time
```

At this point the main processor routine waits until the Watchdog Interrupt Service Routine completes its tasks. To save power, the CPU is placed in the low power 'sleep' mode (step 214). Listed below is exemplary firmware in pseudo C code to implement the above functions.

```
// Check Xtal startup flag - wait for watchdog interrupt
    while (XtalFlg == 0)
    {
        _BIS_SR(CPUOFF);    // Enter LPM0
    }
```

Figure 4:
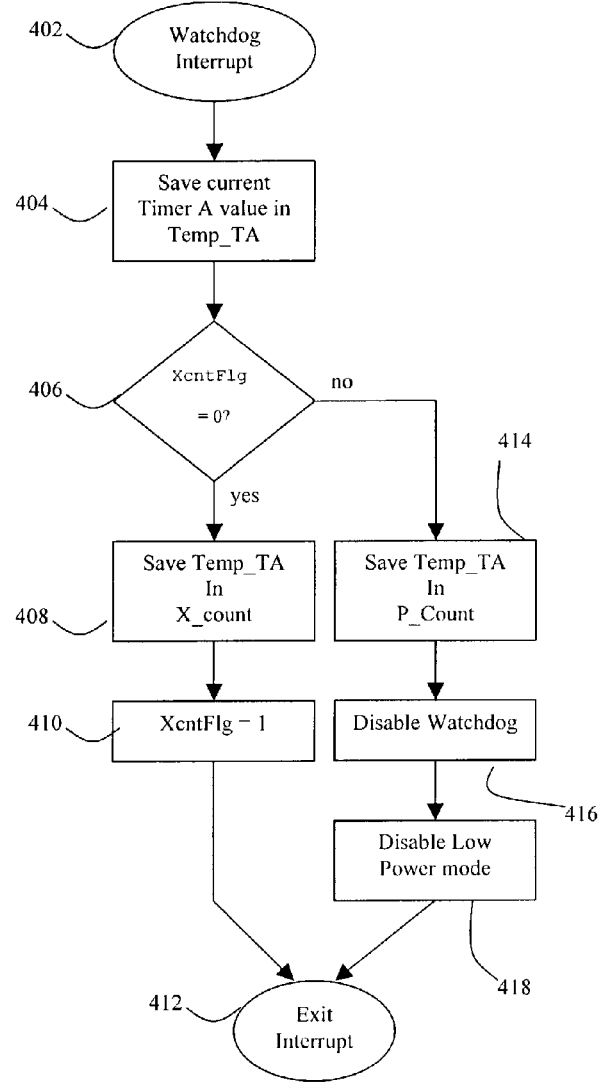
FIG. 4 is a flow chart of a watchdog interrupt service routine according to the first exemplary embodiment.

The watchdog timer interrupt service routine, described with reference to FIG. 4, is first used to indicate when the crystal Y1 oscillator is oscillating. The watchdog timer is clocked by the crystal oscillator. Upon the occurrence of a first watchdog interrupt indicating the startup of the crystal oscillator, the current Timer A value is saved (step 404) in a temporary location, Temp_TA, for later use within the watchdog timer interrupt service routine. The routine will then proceed depending on the value of the variable XcntFlg (step 406). The value of XcntFlg will be zero upon the first watchdog interrupt to cause the first interrupt to store the value of Temp_TA, which is the Timer A count representing the number of oscillations of the RC oscillator before crystal Y1 startup, in X_Count (step 408). The value of XcntFlg is then set to 1 (step 410) and the watchdog interrupt service routine is exited (step 412).

Upon the next occurrence of a watchdog interrupt, the current Timer A value is saved (step 404) in a temporary location, Temp_TA, for later use within the watchdog timer interrupt service routine. The value of XcntFlg=1 is set after the first watchdog interrupt and the routine will proceed (from step 406) to save Temp_TA (Timer A value) in P-Count (step 414). The value now stored in P-Count represents the number of oscillations of the RC oscillator in 1.953 ms. The watchdog interrupt is disabled (step 416) and the CPU is returned to the run mode (step 418) so that the main processor routine can continue (with step 216 in FIG. 2) before exiting (step 412) the watchdog interrupt service routine after the second watchdog interrupt. Listed below is exemplary firmware in pseudo C code to implement the watchdog interrupt service routine.

```
// ***** Watchdog Timer interrupt service routine
interrupt[WDT_VECTOR] void watchdog timer(void)
{
    Temp_TA = TA_HW * 0x10000 + TAR; // Save current Timer
    if (XcntFlg == 0)    // Is this X_Count (first time?)
    {
        X_Count = Temp_TA;    // Yes - save as X_Count
        XcntFlg = 1;          // and mark as complete
    }
    else
    {
    P_Count = Temp_TA - X_Count: // save P_Count
    if (P_Count > 0xFE00)
    {                         // P_Count Long - crystal must
// not be running properly
        X_Count = Temp_TA;    // Resave X_Count
    }
    else
    {                         // Within range - must be P_Count
        WDTCTL = WDTPW + WDTHOLD; // Stop watchdog timer
        IE1 & !WDTIE;         // disable watchdog interrupts
        LPM4_EXIT;            // leave LPM
        XtalFlg = 1;          // we're done timing
    }
  }
}
```

Once the watchdog interrupt service routine has completed, the CPU is returned to the run mode. With reference to FIG. 2, the main processor routine then calculates the startup time (Proc_Time) of the crystal oscillator (step 216).

Calculate crystal startup time (in terms of final timer counts)

Proc_Time=4*(X_Count/P_Count);

This startup time will be subtracted from desired time to self-destruct (step 218) and Timer A is then re-initialized and preset with the desired time minus the startup delay time (step 220). The CPU sets the output voltage signal 122 to 2 volts (step 222) by altering the feedback to regulator U2 to reduce power consumption and the CPU is then again placed in the low power mode (step 224) while it waits for the Timer A interrupt to occur at the desired time.

```
// Restart Timer with final countdown
    CCR0 = Timeout - Proc_Time;  // calculate timer setting
    TACTL = 0x00;                // disable timer
    BCSCTL1 |= DIVA1 + DIVA0;    // set clock for Aclk = 1/8 Xtal
    TACTL = 0x1D4;               // restart timer 1/8 Aclk
    CCTL0 |= CCIE;               // enable timer interrupt
    TmrFlg = 1;                  // This is it!
// Go to sleep . . .
    while (1)
    {
        _BIS_SR(LPM3);           // Enter LPM3 (just timer running
    }
} // END OF MAIN
```

The Timer A interrupt service routine is described with reference to FIG. 3. Timer A serves two functions. As described above with regard to FIG. 2 (step 206), Timer A is initially clocked by the RC oscillator and configured to count the oscillations of the RC oscillator and generate an interrupt (step 302) upon an overflow. To ensure that an overflow does not affect calculations, an additional 16 bits of resolution is added in firmware. This is implemented by incrementing TA_HW (step 304) upon each Timer A interrupt. The Tmr_Flg equals 0 during this first function of Timer A and the interrupt routine is exited (step 312) after each interrupt which increments TA_HW.

The second function of Timer A is to perform the timing for triggering the SCR. Timer A is initialized to perform this second function when the main processor routine (described above with reference to FIG. 2) reinitializes Timer A (step 220) to be clocked by the crystal oscillator and to perform the timing function for initiating generation of the firing signal by the controller 160 on output signal line 142. The reinitialization by the main processor routine includes setting the Tmr_Flg to 1 (see step 220 with regard to FIG. 2 and the main processor routine). When a Timer A interrupt is generated (step 302) after Timer A counts to the desired time minus the startup delay time, because Tmr_Flg now equals 1 (step 306), the routine proceeds to increase the voltage level of output voltage signal line 122 to three volts (step 308) and then fires the SCR (step 310) and the M100 detonator. Listed below is exemplary firmware in pseudo C code to implement the Timer A interrupt service routine.

```
// ***** Timer A0 interrupt service routine (CCFIG0)
interrupt[TIMERA0_VECTOR] void Timer_A0 (void)
{
    ++TA_HW;                     // Increment High word
    if(TmrFlg == 1)
    {
        while (1)                // DO THIS LOOP FOREVER
        {
            P1OUT &= !Vdwn;      // power up to 3.3V (Vdwn = 0)
            P1OUT |= Output;     // Fire SCR
        }
    }
}
```

While others have rejected the use of SSLi batteries for cold temperature applications, the above-described exemplary fuzing system exploits the advantage of a long shelf life of an SSLi battery while compensating for its poor low temperature performance by combining the battery with an ultra low current microcontroller circuit. As used herein, the term "ultra low current" is less than twenty-five microamperes (25 μA or 25 millionths of an ampere).

Each component of the circuit may consume current once the switch SW1 is closed. The current budget of the circuit is analyzed below by calculating the net draw on the battery BT1 by summing of all the individual currents loops (in accordance with Kirchhoff's Second Law at any point in a circuit where the current can divide, the sum of the currents into a junction must equal the sum of the currents out of the junction). The current budget of the exemplary circuit of FIG. 1 is estimated below in Table 1 on a per loop basis using worst-case average currents. As used in Table 1 below, the term "A+B" means A in series with B and the term "A∥B" means A in parallel with B.

TABLE 1

| Current Loop | Current (μA) |
| --- | --- |
| U1 + Y1 + (R2∥R4) | 2 |
| U2 | 3 |
| R1 + [C3∥(R5 + D1$_{AC}$)] | 4 |
| R3 + (C4∥D1$_{GC}$) + R5 | 0 |
| R10 + (R9∥R12) | 2 |
| C1∥C6 | <1 |
| C5∥C2 | <1 |
| TOTAL | <14 |

The above calculation is for a worst scenario and the typical current budget for the exemplary circuit is 8 μA. Other applications may require additional current but are not expected to exceed 25 μA.

The remaining capacity of a 100 μA 1 cm$^2$ battery after 20 years is calculated according to the following formula:

$$R = C*(1-Apt)$$

Where R is the remaining capacity, C is the starting capacity, A is cathode surface area, p is the percent discharge per unit time per unit surface area, and t is tine. After 20 years, the remaining capacity R equals $$R = 100*(1-1*0.02*20) = 60 \text{ μAh}$$

A circuit according to the exemplary embodiment requires about 0.7 μAh to function for two minutes which is within the remaining capacity R of the battery.

Second Exemplary Embodiment

Figure 5:
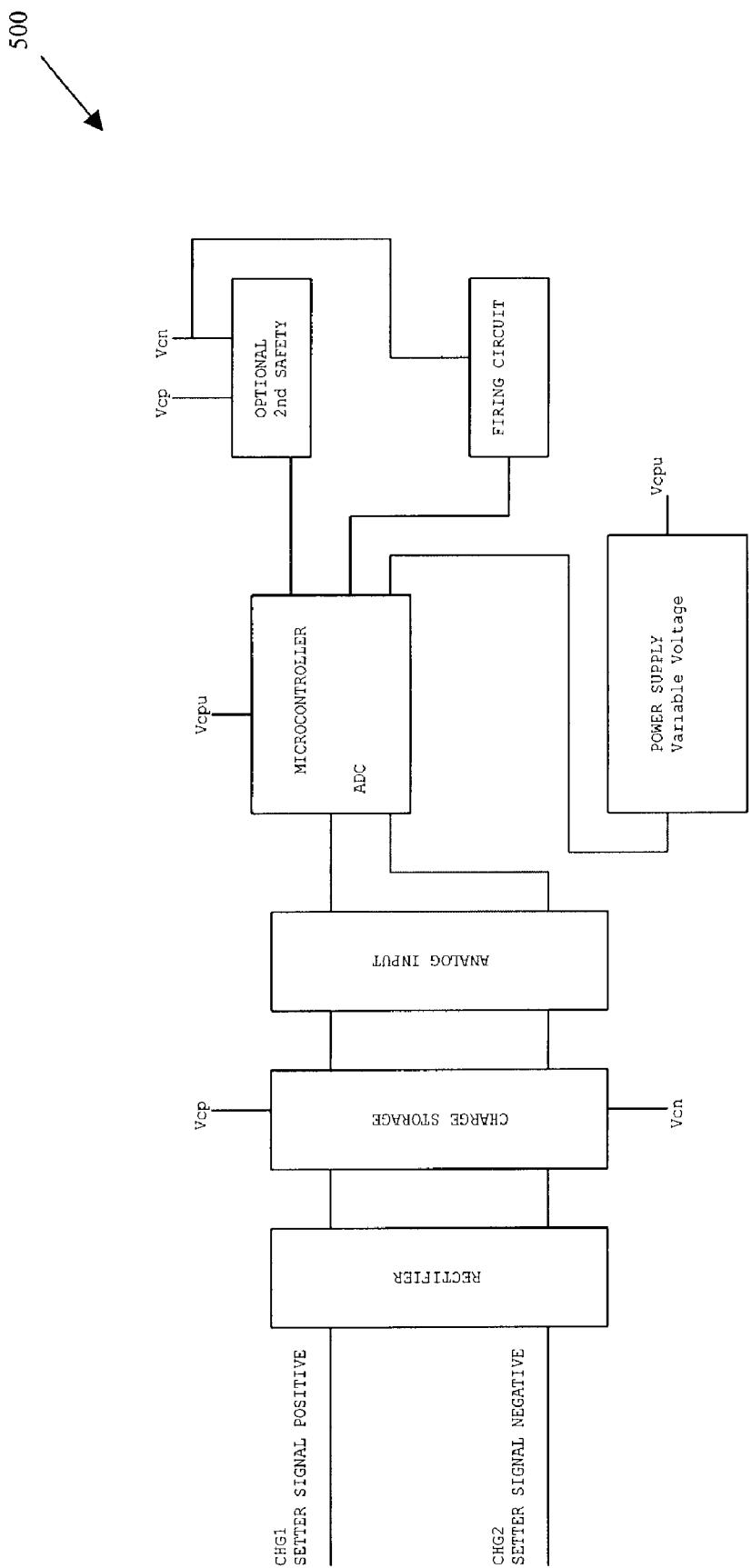
FIG. 5 is a block diagram of a second exemplary embodiment of the present invention.

FIG. 5 is a block diagram 500 of a circuit according to the second exemplary embodiment described below with reference to the circuit of FIGS. 6A-D. The circuit of FIGS. 6A-D comprises seven functional areas: a power supply 600; a rectifier 610; a charge storage circuit 620; an analog input circuit 630; a controller 640; a firing circuit 650; and an optional second safety 660. The energy to power the circuit is delivered to the circuit as a pulse that charges a bank of capacitors. In order to survive a timing demand of 24 seconds and retain sufficient energy for detonation, the circuit is designed to draw less than 25 uA. A crystal Y2 provides an accurate time reference and a low frequency crystal consumes less operating current than a high frequency crystal. This trade-off is negated in accordance with the method described above with regard to the first exemplary embodiment to obtain high timing accuracy with low current consumption.

Figure 6A:
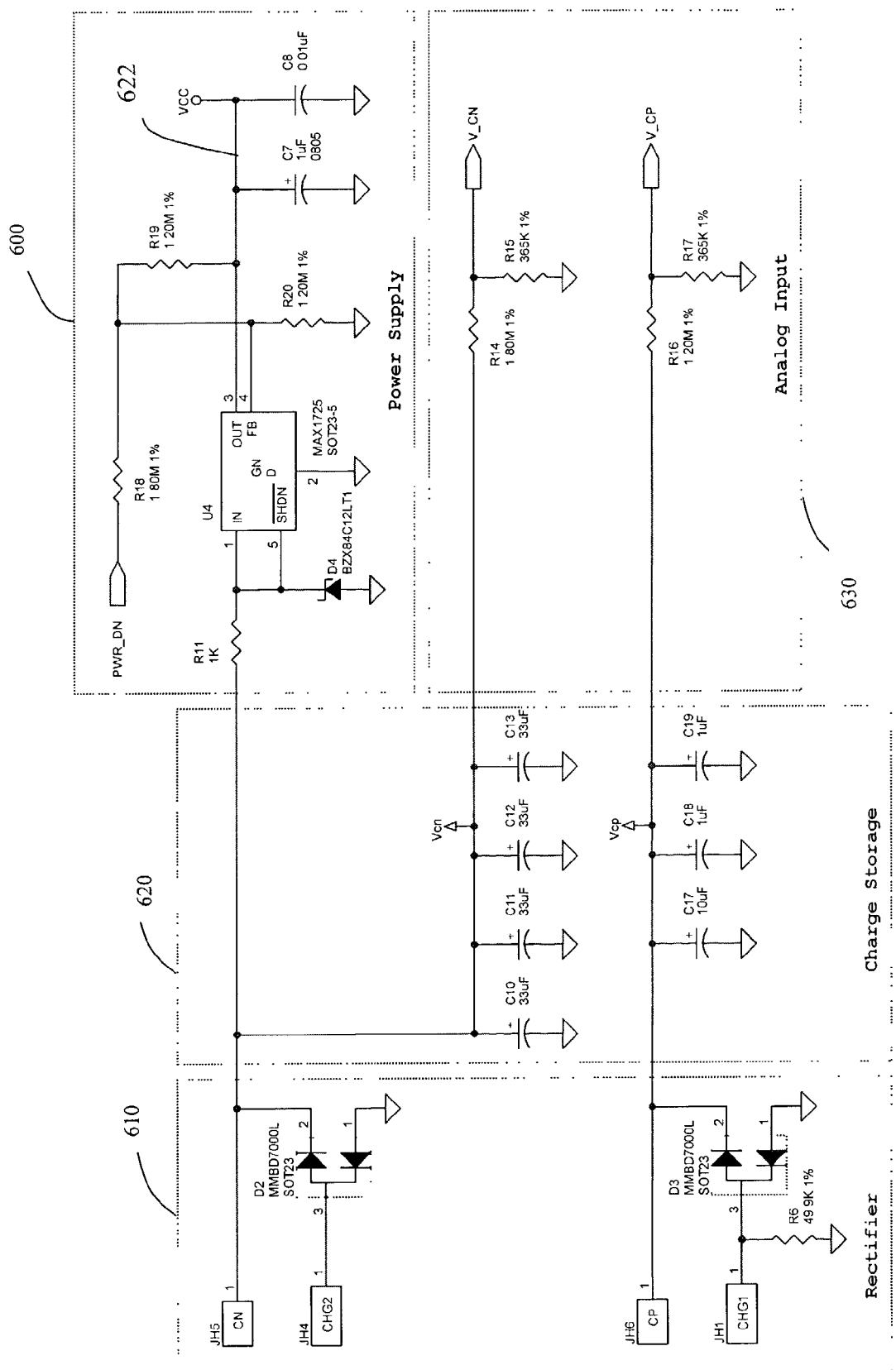
FIGS. 6A-D are schematics of a circuit according to the second exemplary embodiment.

With reference to FIG. 6A, the rectifier 610 comprises dual diodes D2 and D3 and resistor R6. The dual diodes D2 and D3 are configured as a variation of a bridge rectifier. There is a setter signal which has a positive going portion and a negative going portion that comes from a fire control system. The setter signal is isolated from ground and is manifested as a positive or negative potential between input signals CHG1 and CHG2. The input signal CHG1 is first positive relative to CHG2 and then the potential is reversed so that CHG1 is negative relative to CHG2. The exemplary circuit of FIGS. 6A-D uses the setter signal for two purposes: 1) the signal is interpreted for timing information contained in the peak-to-peak amplitude; and 2) the negative going portion of the setter signal is used as a power source for the circuit.

Figure 6B:
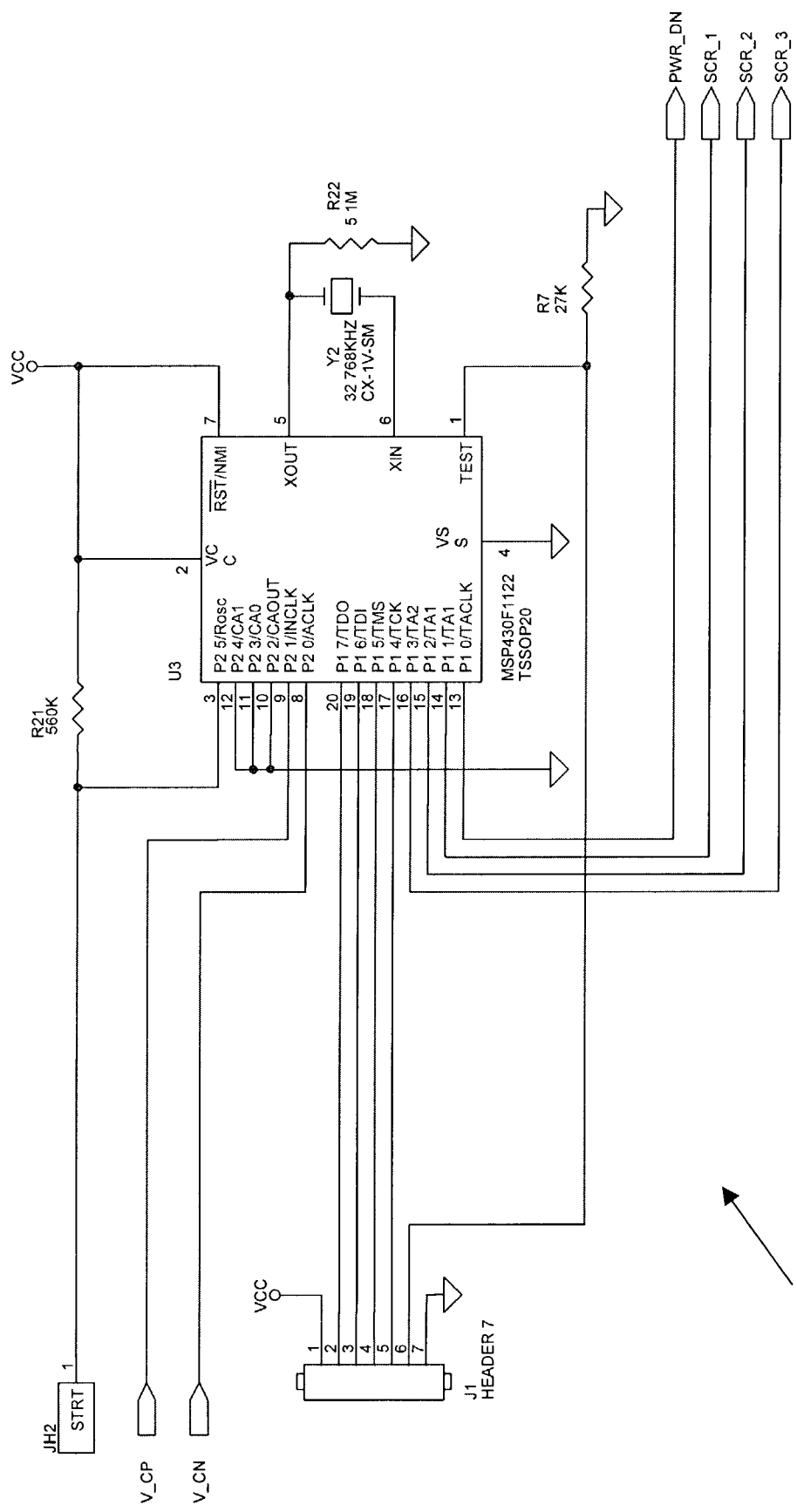
Figure 6C:
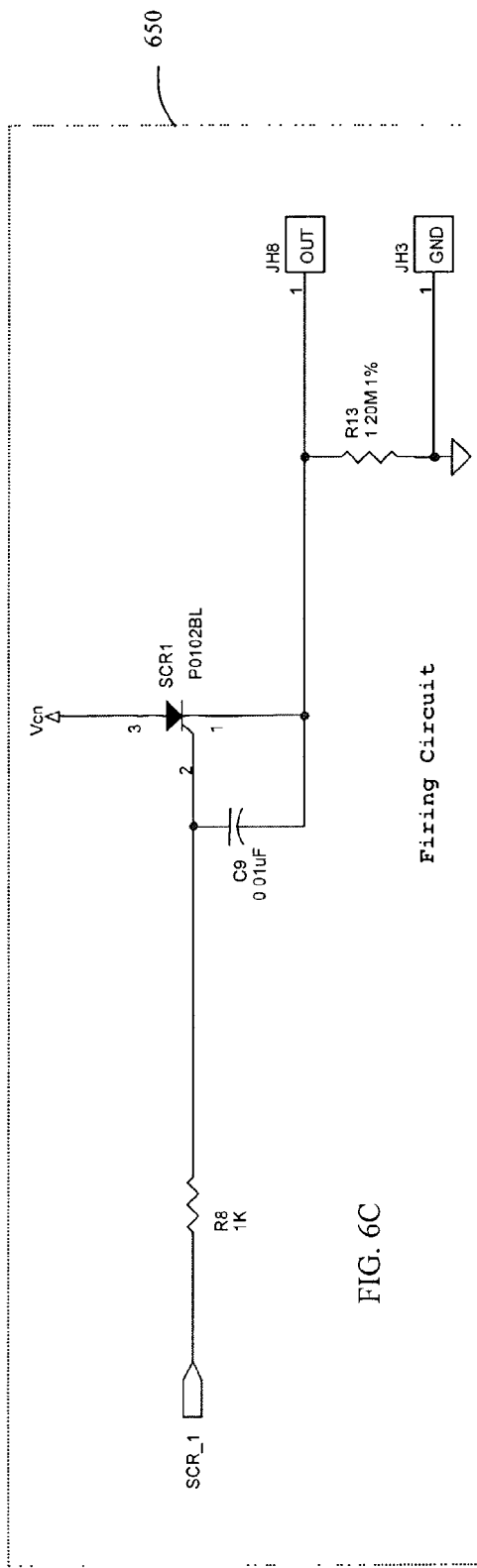
Figure 6D:
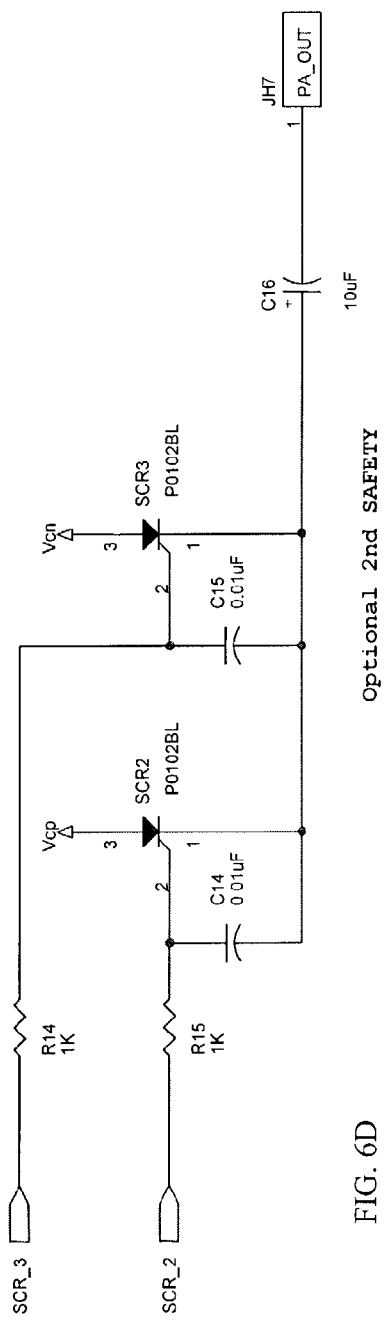

The charge storage circuit 620 comprises two banks of capacitors identified by the voltage they bare: bank Vcp comprising capacitors C17, C18 and C19 and bank Vcn comprising capacitors C10, C11, C12 and C13. The rectifier 610 directs the positive portion of the setter signal to bank Vcp and the negative portion of the setter signal to bank Vcn and ensures that the charge stored on both capacitor banks is positive relative to the microcontroller U3 (FIG. 6B). The resistor R6 of the rectifier 610 is a pulldown resistor used to start the timer when a setback switch (not shown) connects the CHG1 signal to the STRT signal resulting in a voltage drop on pin 3 of U3 to trigger the start.

The total capacitance of bank Vcp is 12 μF and it records the maximum positive voltage of the setter signal, which contains timing information, and may be selectable as a possible energy source for the optional second safety. The total capacitance of bank Vcn is 132 μF and it records the maximum negative voltage of the setter signal, which contains timing information, provides a source of power during the timing phase, and may be selectable as a possible energy source for the optional second safety.

The power supply comprises a regulator U4, a zener diode D4, resistors R11, R18, R19 and R20, and capacitors C7 and C8. Like the first exemplary embodiment, the power supply is based on the Maxim MAX1725 low quiescent voltage regulator, however; in this case, there is not a battery. The resistor R11 and zener D3 make up a protective pre-regulator that protects the input of the regulator U4 from voltages greater than 12 volts. The resistors R19 and R20 form a feedback network that determines the voltage level of output voltage signal line 622. The feedback network is coupled to the controller 640 by a resistor R18 thereby permitting the controller 640 to control the output voltage by altering the feedback. The power supply 600 includes a capacitor C7 for stability and a capacitor C8 as a high frequency noise bypass.

The analog input circuit comprises resistors R14, R15 and R16, R17 arranged as a pair of voltage dividers. The analog input circuit interfaces the capacitor banks of the charge storage circuit 620 to the analog to digital (A/D) converters of the microcontroller U3 (in FIG. 6B). The analog input circuit 630 scales the Vcn and Vcp signals into a range below 3 volts for A/D conversion. The resistors R16, R17 divide the Vcp signal by a ratio of approximately 4.3:1 (approximately 23%) to become V_CP. The resistors R14, R15 divide the Vcn signal by a ratio of approximately 5.9:1 (approximately 17%) to become V_CN.

With reference to FIG. 6B, the controller circuit 640 comprises a mixed signal microcontroller U3, a header J1, resistors R21, R22 and R7, and a crystal Y2. In this exemplary embodiment, the microcontroller U3 is a Texas Instruments MSP430F1122 Mixed Signal Microcontroller that is an ultra low current microcontroller with embedded hardware A/D converters. The microcontroller U3 serves to vary the power supply 600 voltage signal 622 Vcc, to analog to digitally A/D convert V_CP and V_CN to interpret timing information within the setter signal, to compensate for the crystal Y2 startup delay and keep time, to optionally function either of the second safety SCR's, if applicable and to signal the firing circuit time out.

The header J1 is a JTAG port and enables a computer interface to read and write the program memory. This provides a data-recording feature to allow post-event access to and analysis of critical launch and process information such as setback time, temperature, and A/D conversion values.

The firing circuit 650 comprises a silicon controlled rectifier SCR1, resistors R8, R13, and a capacitor C9. A resistor R8 interfaces the microcontroller U3 to the gate of the SCR1. The firing energy is provided by the charge that remains on the Vcn capacitor bank at the time the microcontroller U3 activates the SCR_1 signal. In this exemplary embodiment, the output signal OUT at connector JH8 is coupled to an M84 electrical detonator. The energy of this output signal OUT must be 50 µJ (500 erg) or more as is required to initiate the detonator. The capacitor C9 is a filter and the resistor R13 prevents the inadvertent triggering of SCR1 due to noise and/or the sudden appearance of the M84 impedance upon arming.

The optional second safety 660 comprises a pair of firing circuits comprising silicon controlled rectifiers SCR2, SCR3, resistors R14, R15, and capacitors C14, C15, and C16. This provides the optional ability to function a piston actuator as a second safety whereby the controller U3 will function the piston from either Vcp signal or the Vcn signal, depending on whether or not the former has sufficient energy. A capacitor C16 limits the amount of energy delivered in the event the piston shorts rather than opens post initiation while capacitors C14, C15 are filters.

Figure 7:
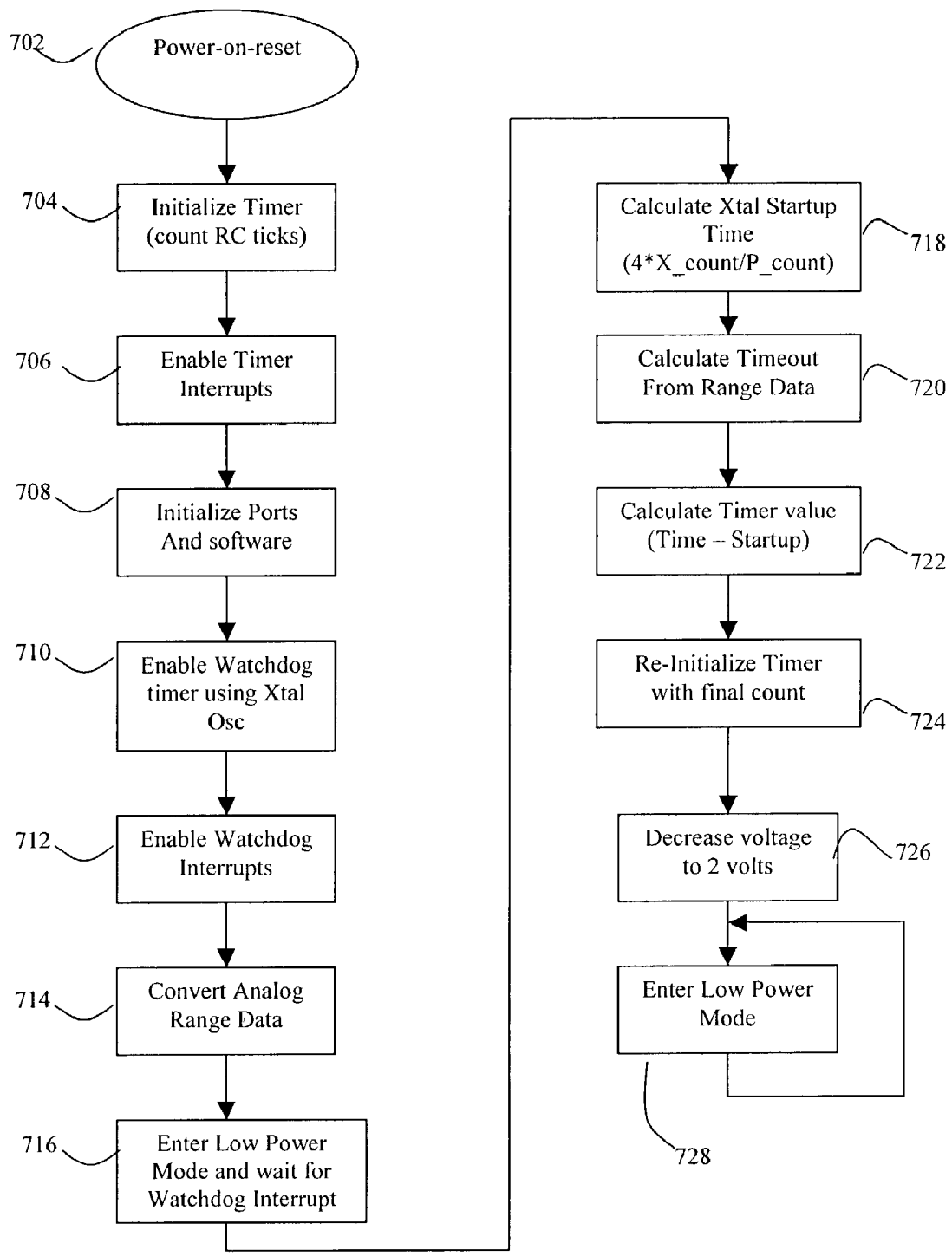
FIG. 7 is a flow chart of a main processor routine according to the second exemplary embodiment.

The microcontroller U3 comprises an internal RC oscillator that functions as a clock source for the central processing unit (CPU) of the microcontroller upon power-on-reset (POR). With reference to FIG. 7, upon power-on-reset (step 702), the microcontroller U3 configures (step 704) an internal timer (Timer A) to count the cycles of the internal RC oscillator. The Timer A interrupt is then enabled (step 706) so that an interrupt is generated upon any overflows of Timer A that may occur. Listed below is exemplary firmware in pseudo C code to implement the above functions.

```
// Initialize Xtal startup timing
    BCSCTL1 = 0x84;         // ACLK = 1/1 Xtal
    BCSCTL2 = 0x00;         // SMCLK = 1/1 DCOCLK
    CCR0 = 0xFFFF;          // Set CCR0 to max
    TACTL = 0x2D4;          // Timer = 1/1 SMCLK
    CCTL0 = CCIE;           // enable CCR0 interrupt
```

After setting up Timer A and enabling its interrupts, the CPU will continue initializing the remaining hardware and software registers (step 708) required for the timing tasks. The CPU also initializes the Watchdog Timer (steps 710, 712) so that it will generate an interrupt after the crystal oscillator begins oscillating. Listed below is exemplary firmware in pseudo C code to implement the above functions.

```
// OK Now setup the ports
    P1OUT = 0;              // All outputs = 0
    P1DIR = 0xF3;           // same as above
    IE1 |= WDTIE;           // enable watchdog interrupts
    _EINT( );
    WDTCTL = 0x5A1F;        // Start WDT as 1.953 mSec
                            //   Timer
    Proc_Time = D_Proc_Time;  // Get default proc_time
```

The main routine now enables the A/D converter and converts (step 714) both the range (V_CP) and power (V_CN) voltages and, when complete, disables the A/D converter to save power. This A/D conversion is performed while timing the crystal startup with the RC oscillator. All timing functions are accomplished in hardware timers and interrupt service routines and therefore have no special requirements on the main routine. Listed below is exemplary firmware in pseudo C code to implement the A/D conversion.

Convert Range and Power analog inputs
ConvertAnalog (Range, Power);

At this point the main processor routine waits until the Watchdog Interrupt Service Routine (see description of watchdog interrupt service routine above with reference to FIG. 4 of the first exemplary embodiment) completes its tasks. To save power, the CPU is placed in the low power 'sleep' mode (step 716). Listed below is exemplary firmware in pseudo C code to implement the above functions.

```
// Check Xtal startup flag - wait for watchdog interrupt
    while (XtalFlg == 0)
    {
        _BIS_SR(CPUOFF);     // Enter LPM0
    }
```

Once the watchdog interrupt service routine has completed, the CPU is returned to the run mode. The main processor routine then calculates the startup time of the crystal oscillator (step 718) as described above with regard to the first exemplary embodiment.

Timer A is then updated with the correct timeout value. The correct timeout is calculated (steps 720, 722) from the range and power voltages that were A/D converted earlier. The timer is started before this calculation so the time to perform the calculation is not added to the desired timeout. Timer A is then re-initialized and preset with the desired time minus the startup delay time (step 724).

```
// Calculate desired timeout
    Timeout = CalculateTimeout (Range, Power);
    CCR0 = Timeout - Proc_Time;    // calculate timer setting
// Restart Timer with final countdown
    CCR0 = 0xFFFF;                 // max timer setting
    TACTL = 0x00;                  // disable timer
    BCSCTL1 |= DIVA1 + DIVA0;      // set clock for Aclk = 1/8 Xtal
    TACTL = 0x1D4;                 // restart timer 1/8 Aclk
    CCTL0 |= CCIE;                 // enable timer interrupt
    TmrFlg = 1;                    // This is it!
```

The CPU then sets the PWR_DN signal to alter the power supply 600 feedback to regulator U4 to reduce the output voltage Vcc to 2 volts (step 726) to reduce power consumption. The CPU is then again placed in the low power mode (step 728) while it waits for the Timer A interrupt. The main routine has completed its task and therefore has an endless loop around the sleep command to protect against a runaway condition. The final detonation function is carried out in the Timer A Interrupt Service Routine.

```
// Go to sleep . . .
    while (1)
    {
        _BIS_SR(LPM3);        // Enter LPM3 (just timer running
    }
} // END OF MAIN
```

Figure 9:
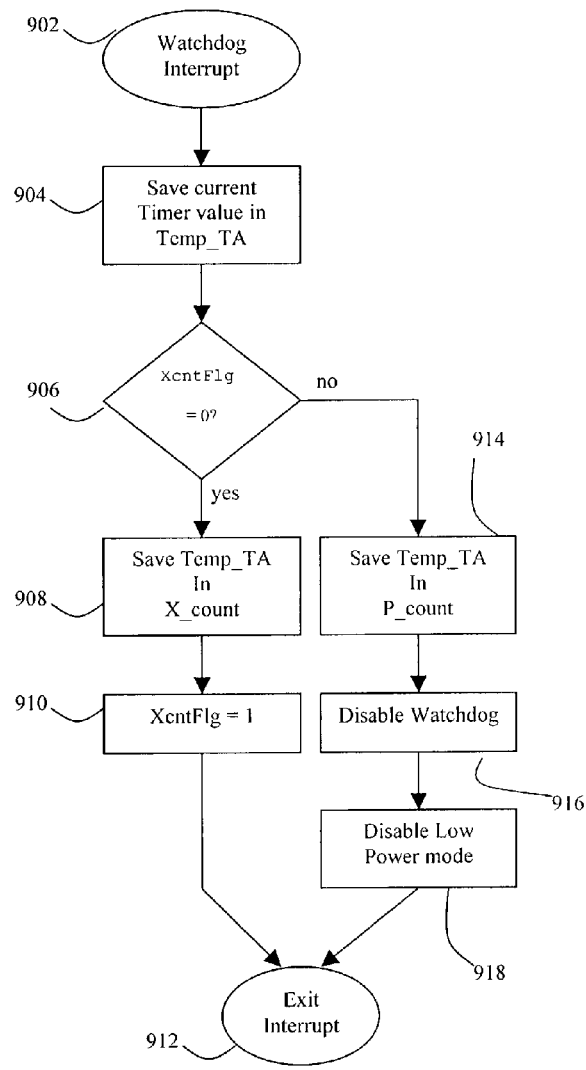
FIG. 9 is a flow chart of a watchdog interrupt service routine according to the second exemplary embodiment.

The watchdog timer interrupt service routine, described with reference to FIG. 9, is used to indicate when the crystal Y2 oscillator is oscillating. The watchdog timer is clocked by the crystal oscillator. Upon the occurrence of a first watchdog interrupt indicating the startup of the crystal oscillator, the current Timer A value is saved (step 904) in a temporary location, Temp_TA, for later use within the watchdog timer interrupt service routine. The routine will then proceed depending on the value of the variable XcntFlg (step 906). The value of XcntFlg will be zero upon the first watchdog interrupt resulting in the first interrupt causing the value of Temp_TA, which is the Timer A count representing the number of oscillations of the RC oscillator before crystal Y1 startup, to be stored in X_Count (step 908). The value of XcntFlg is then set to 1(step 910) and the watchdog interrupt service routine is exited (step 912).

Upon the next occurrence of a watchdog interrupt, the current Timer A value is saved (step 904) in temporary location Temp_TA for later use within the watchdog timer interrupt service routine. The value of XcntFlg now equals 1 as set after the first watchdog interrupt and the routine will proceed (from step 906) to save Temp_TA (Timer A value) in P-Count (step 914). The value now stored in P-Count represents the number of oscillations of the RC oscillator in 1.953 ms. The watchdog interrupt is then disabled (step 916) and the CPU is returned to the run mode (step 918) so that the main processor routine can continue (with step 718 in FIG. 7) before exiting (step 912) the watchdog interrupt service routine. Listed below is exemplary firmware in pseudo C code to implement the watchdog interrupt service routine.

```
// ***** Watchdog Timer interrupt service routine
interrupt[WDT_VECTOR] void watchdog timer(void)
{
    Temp_TA = TA_HW * 0x10000 + TAR; // Save current Timer
    if (XcntFlg == 0)    // Is this X_Count (first time?)
    {
        X_Count = Temp_TA;    // Yes - save as X_Count
        XcntFlg = 1;          // and mark as complete
    }
    else
    {
        P_Count = Temp_TA - X_Count: // save P_Count
        if (P_Count > 0xFE00)
        {                     // P_Count Long - crystal must
// not be running properly
            X_Count = Temp_TA;   // Resave X_Count
        }
        else
        {                      // Within range - must be P_Count
            WDTCTL = WDTPW + WDTHOLD; // Stop watchdog timer
            IE1 & !WDTIE;     // disable watchdog interrupts
            LPM4_EXIT;        // leave LPM
            XtalFlg = 1;      // we're done timing
        }
    }
}
```

Figure 8:
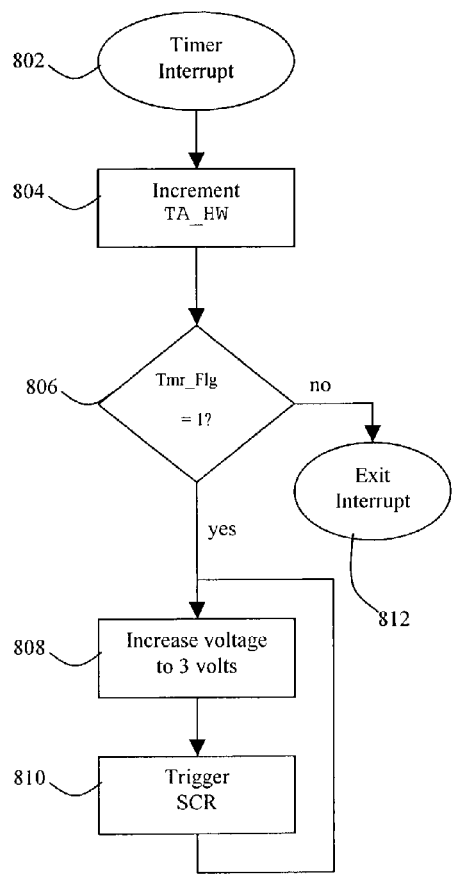
FIG. 8 is a flow chart of a timer interrupt service routine according to the second exemplary embodiment.

The Timer A interrupt service routine, described with reference to FIG. 8. Timer A serves two functions. As described above with regard to FIG. 7 (step 706), Timer A is initially clocked by the RC oscillator and configured to count the oscillations of the RC oscillator and generate an interrupt (step 802) upon an overflow. To ensure that an overflow does not affect calculations, an additional 16 bits of resolution is added in firmware. This is implemented by incrementing TA_HW (step 804) upon each Timer A interrupt. Thus, TA_HW functions as the high order 16 bits of the count of the RC oscillator. The Tmr_Flg equals 0 during this first function of Timer A and the interrupt routine is exited (step 812).

Timer A is initialized for its second function after the second watchdog interrupt occurs when the main processor routine (described above with reference to FIG. 7) reinitializes Timer A (step 724) to be clocked by the crystal oscillator and to perform the timing function for initiating generation of the firing signal by the controller 160 on output signal line 142. The reinitialization by the main processor routine includes setting the Tmr_Flg to 1 (see step 724 with regard to FIG. 7 and the main processor routine). When a Timer A interrupt is generated (step 802) after Timer A counts to the desired time minus the startup delay time, because Tmr_Flg now equals 1 (step 806), the routine proceeds to increase the voltage level of output voltage signal line 622 to three volts (step 808) and then fires the SCR1 (step 810). Listed below is exemplary firmware in pseudo C code to implement the Timer A interrupt service routine.

```
// ***** Timer A0 interrupt service routine (CCFIG0)
interrupt[TIMERA0_VECTOR] void Timer_A0 (void)
{
    ++TA_HW;              // Increment High word
    if(TmrFlg == 1)
    {
        while (1)         // DO THIS LOOP FOREVER
        {
            P1OUT &= !Vdwn;   // power up to 3.3V (Vdwn = 0)
            P1OUT |= Output;  // Fire SCR
        }
    }
}
```

Thus, the second exemplary embodiment allows a system to achieve high accuracy timing from POR at a very low current. This is possible due to the correction of the crystal startup delay. With the correction, the standard deviation of timing from POR is less than 8 ms despite crystal startup delays arbitrarily ranging between 200 ms and 600 ms. Although higher frequency crystal oscillators can start almost instantly and theoretically could provide comparable standard deviations, such high frequency crystal oscillators require a greater operating current and would result in a low power system running out of power before function (detonation) time. The present invention allows a system using a low frequency crystal oscillator to have the same quick start timing that a high frequency crystal oscillator provides but without the high current consumption of a high frequency crystal.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A timing system for a fuze system, the timing system, having a shelf life greater than twenty years and operable at temperatures down to −45.6° C. comprising:
   controller comprising a first oscillator;
   a solid-state thin film battery coupled to the controller, wherein the controller is operable to correct for a startup delay of the first oscillator; and
   the fuze system having a shelf life of greater than twenty years and operable at temperatures down to at least −45.6□C.

2. The timing system according to claim 1 wherein the controller draws a mean current less than 25 microamperes.

3. The timing system according to claim 1 wherein the solid-state thin film battery is a lithium battery.

4. The timing system of claim 1 wherein the controller is coupled to the solid-state thin film lithium battery via a switch, the controller configured to draw a mean current of less than 8 microamperes and to generate a firing signal.

5. The timing system of claim 4 wherein the controller further comprises:
   a second oscillator having a second startup time, the first oscillator having a first startup time subsequent to the second startup time;
   a first counter coupled to the second oscillator, the first counter generating a first count corresponding to a number of oscillations of the second oscillator during a first period beginning at the second startup time and corresponding to the startup delay; and
   a second counter coupled to the second oscillator, the second counter generating a second count corresponding to a number of oscillations of the second oscillator during a second period of known duration; and
   a processor coupled to the first counter and to the second counter for using the first count and second count to generate a time value corresponding to the first period.

6. The timing system of claim 5 wherein the frequency of the second oscillator is unknown and the frequency of the first oscillator is known and the second period begins after the startup delay and corresponds to a predetermined number of oscillations of the first oscillator.

7. The timing system of claim 5 wherein:
   the controller further comprises an interrupt generator coupled to the first oscillator and to the processor;
   the interrupt generator generates an interrupt to indicate oscillation of the first oscillator; and
   the processor generates the time value in response to the interrupt.

8. The timing system of claim 5 wherein the processor generates the time value corresponding to the first period with an accuracy within ±3 m seconds.

9. The timing system of claim 5 wherein the second oscillator comprises a resistor and a capacitor and the first oscillator comprises a crystal.

10. A timing system comprising:
    a first oscillator, wherein a frequency of the first oscillator is known;
    a second oscillator, wherein a frequency of the second oscillator is unknown;
    a first counter coupled to the second oscillator, the first counter generating a first count corresponding to a number of oscillations of the second oscillator during a first period beginning at a startup time;
    a second counter coupled to the second oscillator, the second counter generating a second count corresponding to a number of oscillations of the second oscillator during a second period of a known duration; and
    a processor coupled to the first counter and to the second counter for receiving the first count and the second count and generating a time value corresponding to the first period based on the first count and the second count, wherein the time value corresponds to a startup delay of the first, and wherein the second period begins after the startup time of the first oscillator and corresponds to a predetermined number of oscillations of the first oscillator.

11. The timing system of claim 10 further comprising a power source, the timing system having a shelf life greater than twenty years and operable at temperatures down to −45.6° C.

12. The timing system of claim 11 wherein the first oscillator, the second oscillator, the first counter, the second counter, and the processor collectively draw a mean current less than 25 microamperes.

13. The timing system of claim 10 wherein the frequency of the second oscillator is unknown and the frequency of the first oscillator is known and the second period begins after the startup time of the first oscillator and corresponds to a predetermined number of oscillations of the first oscillator.

14. The timing system of claim 10 wherein the processor generates a time value corresponding to the first period with an accuracy within ±3 milliseconds.

15. The timing system of claim 10 wherein the second oscillator comprises a resistor and a capacitor and the first oscillator comprises a crystal.

* * * * *

UNITED STATES PATENT AND TRADEMARK OFFICE
CERTIFICATE OF CORRECTION

| | |
|---|---|
| PATENT NO. | : 7,362,659 B2 |
| APPLICATION NO. | : 10/193437 |
| DATED | : April 22, 2008 |
| INVENTOR(S) | : Jonathan C. Siebott and Richard A. Frantz |

It is certified that error appears in the above-identified patent and that said Letters Patent is hereby corrected as shown below:

Title Page, Item [56] References Cited, U.S. Patent Documents – add
-- 6,553,263*; 4/2003; Meadows et al.; 607/61 --

In column 12, claim 1, line 63 – delete "-45.6☐C" with -- -45.6°C --

Signed and Sealed this

Twenty-second Day of July, 2008

JON W. DUDAS
*Director of the United States Patent and Trademark Office*